United States Patent
Senour

[11] Patent Number: 5,975,156
[45] Date of Patent: Nov. 2, 1999

[54] APPARATUS FOR COLLECTING, STORING AND DUMPING USED MOTOR OIL

[76] Inventor: Dennis R. Senour, 7079 North Co. Rd. 300W, Lizton, Ind. 46149

[21] Appl. No.: 08/971,442

[22] Filed: Nov. 17, 1997

Related U.S. Application Data

[63] Continuation-in-part of application No. 08/764,708, Dec. 2, 1996, abandoned.

[51] Int. Cl.[6] .................................................. B67C 11/00
[52] U.S. Cl. ............................ 141/98; 141/331; 141/337; 184/1.5; 184/106; 220/573
[58] Field of Search ..................... 141/331–342, 141/98; 184/1.5, 106; 220/573; 222/568

[56] References Cited

U.S. PATENT DOCUMENTS

| | | | |
|---|---|---|---|
| Re. 32,458 | 7/1987 | DeLay, Jr. ................................. | 141/98 |
| 2,594,779 | 4/1952 | Huffman ................................. | 184/1.5 |
| 3,140,756 | 7/1964 | Dinkelkamp ............................ | 141/332 |
| 3,667,573 | 6/1972 | Edwards ................................. | 184/1.5 |
| 4,098,398 | 7/1978 | Meyers ................................... | 141/340 |
| 4,130,147 | 12/1978 | Langlie et al. ........................... | 141/98 |
| 4,217,940 | 8/1980 | Wheeler ................................. | 141/98 |
| 4,274,645 | 6/1981 | Ferguson et al. ....................... | 184/1.5 |
| 4,488,584 | 12/1984 | Hestehave et al. ...................... | 141/339 |
| 4,513,865 | 4/1985 | Melzi ..................................... | 220/573 |
| 4,533,042 | 8/1985 | Pollacco ................................ | 141/98 |
| 4,600,125 | 7/1986 | Maynard, Jr. ........................... | 141/331 |
| 4,632,268 | 12/1986 | Melzi ..................................... | 220/573 |
| 4,776,431 | 10/1988 | Polling ................................... | 184/1.5 |
| 4,881,650 | 11/1989 | Bartz ..................................... | 220/573 |
| 5,020,702 | 6/1991 | James ..................................... | 141/337 |
| 5,082,035 | 1/1992 | Maxwell ................................. | 141/98 |
| 5,099,872 | 3/1992 | Tarvin et al. ........................... | 141/337 |
| 5,285,824 | 2/1994 | Krstovic ................................. | 141/98 |
| 5,301,724 | 4/1994 | Maxwell ................................. | 141/98 |
| 5,350,091 | 9/1994 | Leete et al. ............................. | 141/337 |
| 5,503,246 | 4/1996 | Raboin et al. .......................... | 184/1.5 |
| 5,706,873 | 1/1998 | Benoit et al. ........................... | 141/98 |
| 5,722,508 | 3/1998 | Kraus ..................................... | 184/1.5 |

*Primary Examiner*—J. Casimer Jacyna
*Attorney, Agent, or Firm*—Woodard, Emhardt, Naughton, Moriarty & McNett

[57] ABSTRACT

An apparatus for collecting, storing and dumping used motor oil includes an oil container having a top, a bottom and sides and having at least one funnel connector opening sized and configured to removably receive a mating funnel connector member therein; and, at least one funnel having a funnel cup and a funnel connector member connected to and in communication with said funnel cup, said funnel connector member having a size and shape which is removably lockably receivable into the at least one funnel connector opening.

17 Claims, 6 Drawing Sheets

APPARATUS FOR COLLECTING, STORING AND DUMPING USED MOTOR OIL

REFERENCE TO RELATED APPLICATIONS

This is a continuation-in-part of U.S. patent application Ser. No. 08/764,708 filed Dec. 2, 1996, now abandoned.

FIELD OF THE INVENTION

The present invention relates to oil collection systems, and more particularly, to an oil collection system for collecting, storing and dumping used oil from vehicles and the like.

BACKGROUND OF THE INVENTION

The majority of engines require oil for lubrication. Heat, dirt and normal wear and tear of the engine all contribute to the inherent breakdown of the oil, which therefore requires periodic changing. Containers for collecting used motor oil are well known in the art. The most common of such containers is an open-ended pan or bowl that is positioned directly under the engine's oil plug. Improvements in oil collection devices have produced generally closed containers having an opening into which the used oil is directed by a funneling device. Such opening, or a special second opening, is then used at a later time to empty the container.

Examples of a variety of different devices for collecting used motor oil are shown in the following U.S. Patents:

| U.S. Pat. No. | INVENTOR | ISSUE DATE | TITLE |
| --- | --- | --- | --- |
| 5,503,246 | Raboin et al. | April 2, 1996 | CRANKCASE OIL DRAIN PAN |
| 5,301,724 | Maxwell | April 12, 1994 | OIL COLLECTING AND DISPENSING APPARATUS |
| 5,285,824 | Krstovic | Feb. 15, 1994 | VEHICLE OIL DRAINAGE APPARATUS AND METHOD |
| 5,099,872 | Tarvin et al. | March 31, 1992 | LAND-BASED SPILL COLLECTION SYSTEM |
| 5,082,035 | Maxwell | Jan. 21, 1992 | OIL COLLECTING AND DISPENSING APPARATUS |
| 4,881,650 | Bartz | Nov. 21, 1989 | FLUID COLLECTION CONTAINER |
| 4,632,268 | Melzi | Dec. 30, 1986 | DISPOSABLE OIL DRAIN PAN AND CONTAINER COMBINATION |
| 4,533,042 | Pollacco | Aug. 6, 1985 | MOTOR OIL CHANGE KIT AND CATCH PAN FOR USE IN CHANGING AUTOMOTIVE MOTOR OIL |
| 4,513,865 | Melzi | April 30, 1985 | DISPOSABLE OIL DRAIN PAN AND CONTAINER COMBINATION |
| 4,488,584 | Hestehave et al. | Dec. 18, 1984 | DRAINER CONTAINER AND FUNNEL |
| 4,274,645 | Ferguson et al. | June 23, 1981 | PORTO AUTO OIL EASY DRAIN |
| 4,098,398 | Meyers | July 4, 1978 | CONTAINER FOR RECYCLE OF MOTOR OIL |
| 3,667,573 | Edwards | June 6, 1972 | DRAIN SPOUT ATTACHMENT |
| 2,594,779 | Huffman | April 29, 1952 | APPARATUS FOR CLEANING AND LUBRICATING |

While many of the devices disclosed in the above patents facilitate the collection of used motor oil over the standard open-top oil collection bowl, each still exhibits some drawback or inconvenience in use. For example, many of the devices, such as those disclosed in the Krstovic, Bartz and Melzi patents, have no means for positioning the collection area close to the drain plug opening without physically moving the entire container right up next to the plug. The devices of the Maxwell '035, Maxwell '724 and Huffman patents all include a collection funnel member that is connected by a flexible conduit to the container, but the funnel members of each of those devices does not permit easy or precise positioning directly to the drain opening.

What is needed is an oil collection assembly that permits easier and more precise positionment of the collecting member to the drain opening as well as a better means for collection of oil splash or overflow.

SUMMARY OF THE INVENTION

Generally speaking there is provided an apparatus for collecting, storing and dumping used motor oil that includes a variety of interchangeable funnels that each facilitate improved access to the oil drain plug.

An apparatus for collecting, storing and dumping used motor oil includes an oil container having a top, a bottom and sides and having at least one funnel connector opening sized and configured to removably receive a mating funnel connector member therein; and, at least one funnel having a funnel cup and a funnel connector member connected to and in communication with said funnel cup, said funnel connector member having a size and shape which is removably lockably receivable into the at least one funnel connector opening.

It is an object of the present invention to provide an improved apparatus for collecting, storing and dumping used motor oil.

It is another object of the present invention to provide an apparatus for collecting used motor oil that is usable with a variety of different vehicles.

Further objects and advantages of the present invention will become apparent from the following descriptions of the preferred embodiments.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, and any alterations and further modifications in the illustrated device, and further applications of the principles of the invention as illustrated therein are contemplated as would normally occur to one skilled in the art to which the invention relates.

Figure 1:
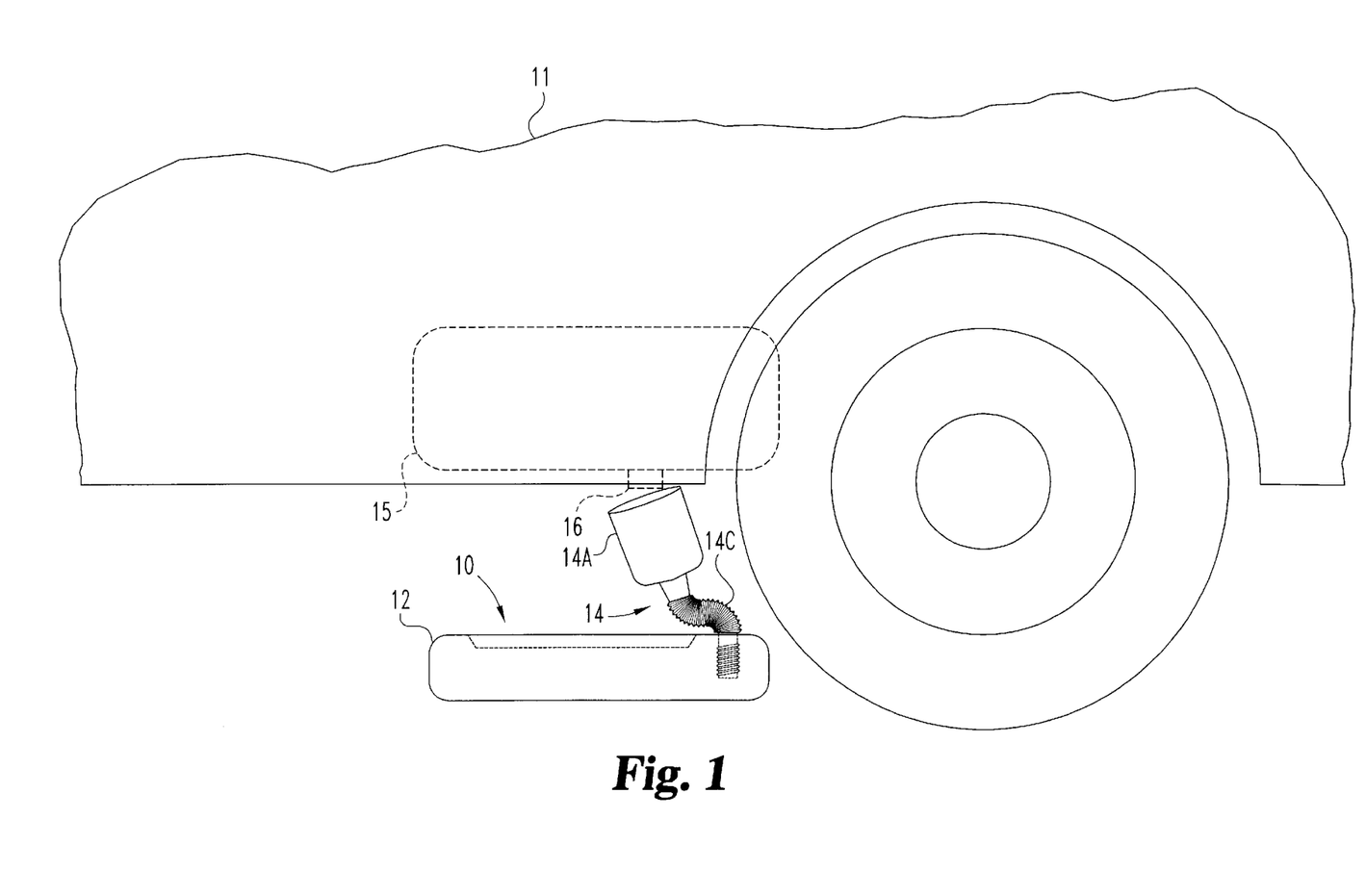
FIG. 1 is a side elevational view of the apparatus 10 for collecting, storing and dumping used motor oil in accordance with the preferred embodiment of the present invention and shown in use under a vehicle.
Figure 2A:
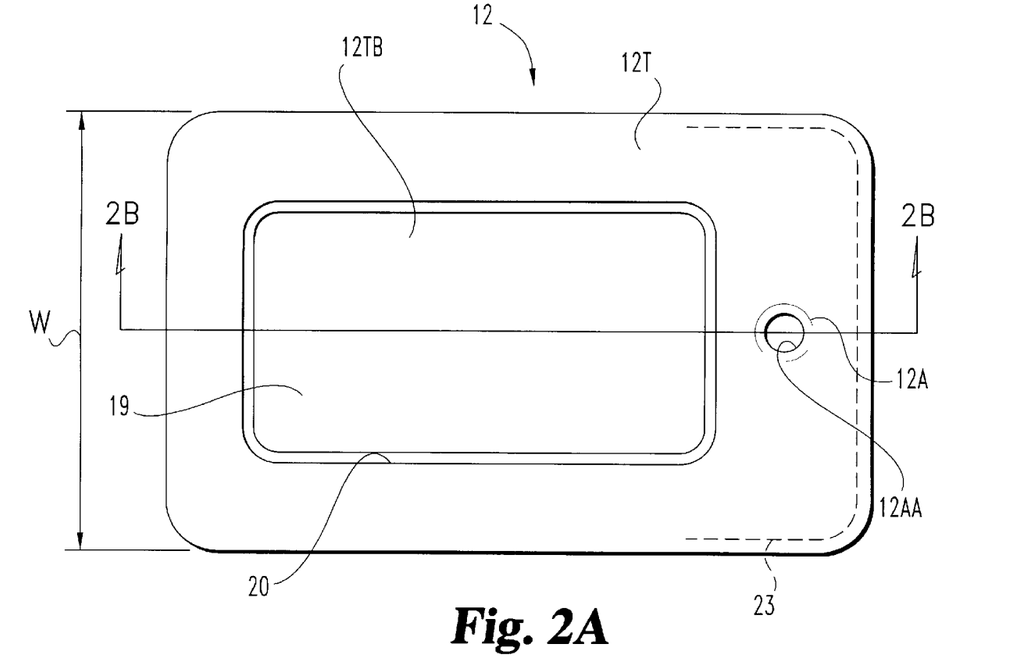
FIG. 2A is a top plan view of container 12 of the apparatus 10 of FIG. 1.
Figure 2B:
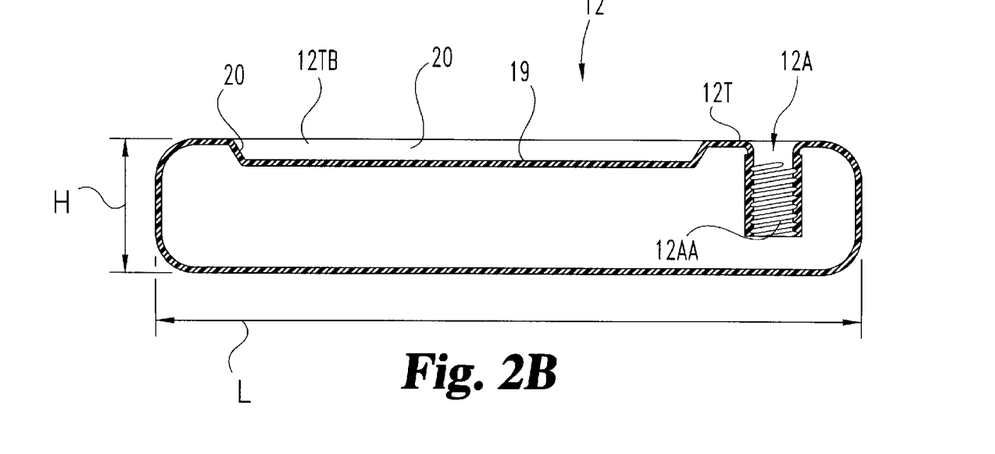
FIG. 2B is a side cross-sectional view of the container 12 of FIG. 2A taken along the lines 2B—2B and shown in the direction of the arrows.

Referring to FIG. 1, there is shown an apparatus 10 for collecting, storing and dumping used motor oil from vehicles in accordance with the preferred embodiment of the present invention. Apparatus 10 generally includes an oil container 12 and a funnel 14. Funnel 14 includes a funnel cup 14A and a neck 14C that is flexible and axially extendable and compressible which allows the user to extend the funnel cup 14A of funnel 14 upwardly to reach oil pan 15 of a vehicle's motor, thereby reducing the chance of spillage. Neck 14C may also be bent to avoid an obstruction which often impedes a direct route from the ground to oil pan 15. Referring to FIGS. 2A and 2B which are top and side views of oil container 12 respectively, oil container 12 has an oil container top 12T which defines at least one funnel connector opening 12A. Connector opening 12A includes internal connector threads 12AA. Oil container 12 further includes at least one oil container top recess 12TB which permits container 12 to be positioned under the oil pan drain opening 16 (FIG. 1) whereby the majority of any oil splash or overflow may be caught in recess 12TB. Recess 12TB is defined by a base 19 and sidewalls or splashguards 20 that surround the periphery of base 19. The depth, width and length of recess 12TB may vary depending on the dimensions of container 12. It is desired that the depth of recess 12TB be enough to permit recess 12TB to hold several ounces of oil should a major overflow or splash occur, and the width and length of recess should be great enough to maximize the catchable area below an oil pan opening 16. In the preferred embodiment, the area defined by recess 12TB should be at least as large, relative to the length and width of container 12 itself, as that shown in FIG. 2A. And, so long as the structural integrity of container 12, when full of oil, is maintained, recess 12TB could extend nearly all the way to the outer edges of container 12, as shown, for example at 23. As to the dimensions of container 12, in one embodiment, $H=(L\times W)/50$, where H=height, L=length and W=width of container 12. Thus, for varying dimensions of the length and width, the height H remains relatively small, and container 12 maintains a low profile. This facilitates positioning of container 12 below even a very low clearance vehicle. While the above formula may vary for different vehicles and their applications, the preferred relationship is $H=(L\times W)/50$ plus or minus ten percent.

Figure 3A:
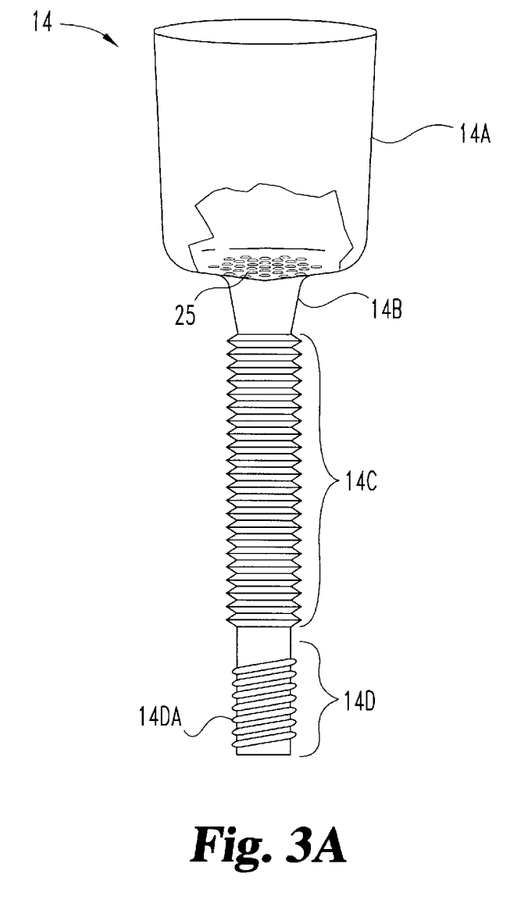
FIG. 3A is a side view of funnel 14 of the apparatus 10 of FIG. 1 and shown with flexible neck 14C in the fully extended position.
Figure 3B:
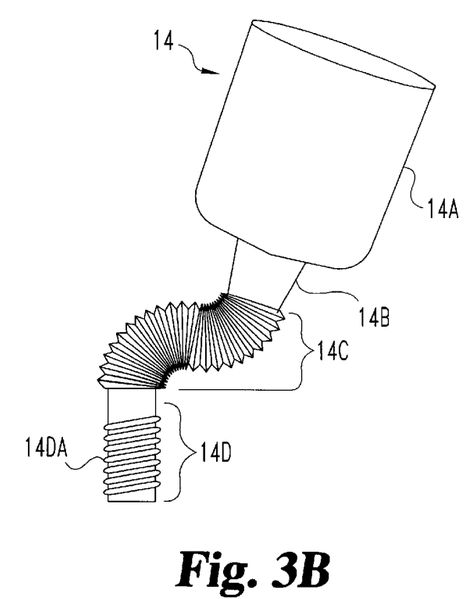
FIG. 3B is a side view of the funnel 14 of FIG. 3A and showing flexible neck 14C bent to position funnel cup 14A in a different position.

Referring to FIGS. 3A and 3B, funnel 14 includes a funnel cup 14A, a transition neck 14B, an interconnecting, funnel flexible neck 14C and a funnel connector member 14D. Funnel connector member 14D is externally threaded at 14DA to mate with internally threaded funnel connector opening 12A. Oil draining system 10 is manufactured from one or more suitable materials depending on the vehicles and environment in which it is to be used. The following materials are examples of suitable materials: plastic, plastic composite, rubber, rubber composite, metal alloy, fiberglass, epoxy, and carbon-graphite.

In the preferred embodiment, transition neck 14B extends downwardly from the bottom of funnel cup 14A where it then connects with the top end of flexible neck 14C. The bottom of flexible neck is connected with the top of funnel connector member 14D. Funnel cup 14A, transition neck 14B, flexible neck 14C and connector member 14D are all generally cylindrical and may be manufactured as a single funnel element or they may exist in multiple pieces to be assembled or interchanged as desired. Transition neck 14B tapers somewhat, as shown, between funnel cup 14A and flexible neck 14C and has a moderate height, all to enable the user to grasp neck 14B and to facilitate positioning of cup 14A to a desired position relative to flexible neck 14C. In other embodiments, transition neck 14B may be straight or tapered more or less than shown or tapered upwardly instead of downwardly. This configuration allows a user to extend the funnel cup 14A a significant distance upwardly (FIG. 3A) to reach an oil pan sitting high off the ground, thereby reducing the chance of oil spillage. This configuration also allows the user to extend the funnel cup 14A upwardly and bend it around objects (see FIG. 3B) which would otherwise impede a direct route to the oil pan.

In use, funnel 14 is connected to oil container 12 by screwing funnel connector member 14D into the internally threaded funnel connector opening 12A. Container 12 and funnel 14 are then moved under oil pan 15, and cup 14 is positioned subjacent drain plug opening 16 of oil pan 15. The drain plug (not shown) is removed, allowing the used oil to flow into cup 14A, through transition neck 14B, flexible neck 14C, connector member 14D and into container 12.

As shown in FIGS. 1 and 3A, cup 14A has a height that exceeds its diameter. This configuration provides a generous receptacle for the oil flowing from oil pan 15, thereby reducing the risk that oil would overflow from cup 14A. Furthermore, in the preferred embodiment, cup 14A is sized sufficiently larger than the standard oil filter (not shown) to enable cup 14A to be positioned up and around such filter. The filter may then be unscrewed, dropped into cup 14A and removed, and any excess oil that may leak out upon unscrewing and removing such filter will be caught within cup 14A. In the preferred embodiment, cup 14A has a diameter that is between about one half inch and two inches greater than the diameter of a standard oil filter. A screen 25, having a diameter less than that of cup 14A at its bottom, rests in the bottom of cup 14A. When the oil pan drain plug is removed, it may drop into cup 14A, but will be prevented from falling into neck 14B by screen 25. The mesh size of screen 25 may vary as desired to catch other debris that may tend to fall into cup 14A. The mesh size should not be so small, however, that it substantially retards the flow of oil into neck 14B.

If oil splash or overflow from cup 14A does occur, despite the more accommodating configuration of funnel 14, it may be caught within recess 12TB, rather than spilling to the user's driveway, garage floor or other surface. It is also noted that the diameters of transition neck 14B, flexible neck 14C and male connector 14D are shown to be large enough to accommodate the flow of oil from cup 14A without the need for a vent plug in container 12. However, an alternative embodiment (see FIGS. 4A–4B) contemplates a vent plug 28 in the top 12T of container 12 in any convenient location to facilitate the flow of oil through funnel 14.

Emptying of container 12 may be accomplished by removing funnel 14 from connector opening 12A and pouring the used oil from connector opening 12A. A vent plug 28 may also be provided in the top 12T of container 12, if desired, to facilitate the exit flow of oil while emptying.

The present invention contemplates the interchangeability of variously sized funnels 14 as desired. That is, the ground clearance and ease of accessibility to the oil drain plug and oil filter varies widely from one vehicle to the next. It is to this variability for the do-it-yourselfer, without the benefit of ramps or an oil change pit over which the vehicle can be driven, that the present invention is directed and finds particular utility. In one application, flexible neck 14C may be completely collapsed to accommodate one vehicle of a certain ground clearance with an easily accessible oil drain plug and filter. Or for another vehicle of lower clearance or more difficult to access drain plug or filter, flexible neck 14C may be bent as shown in FIG. 3B. Where the vehicle has a higher ground clearance, flexible neck 14C may be extended to its full length as shown in FIG. 3A. In still other vehicles, the ground clearance may be extremely high and/or the oil drain plug and/or filter may be particularly hard to get to. In such instances, the user may have an additional funnel (not shown), identical to funnel 14 except for a longer flexible neck 14C, which can be extended to a greater distance or bent around a particular obstruction. Alternatively, flexible neck 14C could be shorter for even other applications. In each of these scenarios, the appropriate funnel 14 may be screwed into connector opening 12A of a single container 12 to provide the user maximum flexibility.

Figure 5:
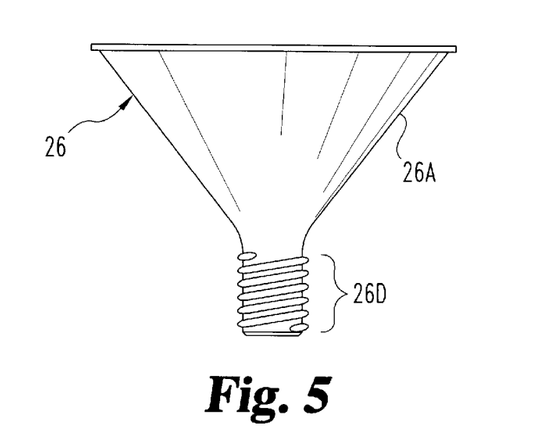
FIG. 5 is a side view of a funnel 26 shown in accordance with an alternative embodiment of the present invention.
Figure 6:
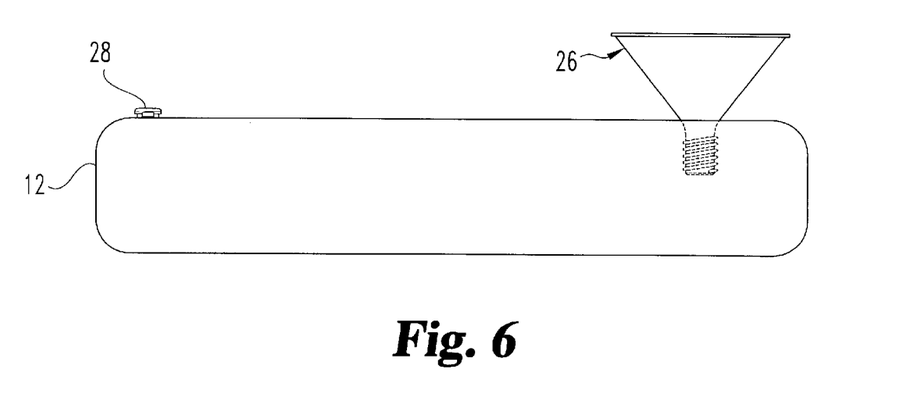
FIG. 6 is a side elevational view of a container 12 and the funnel 26 of FIG. 5 in accordance with an alternative embodiment of the present invention.
Figure 7:
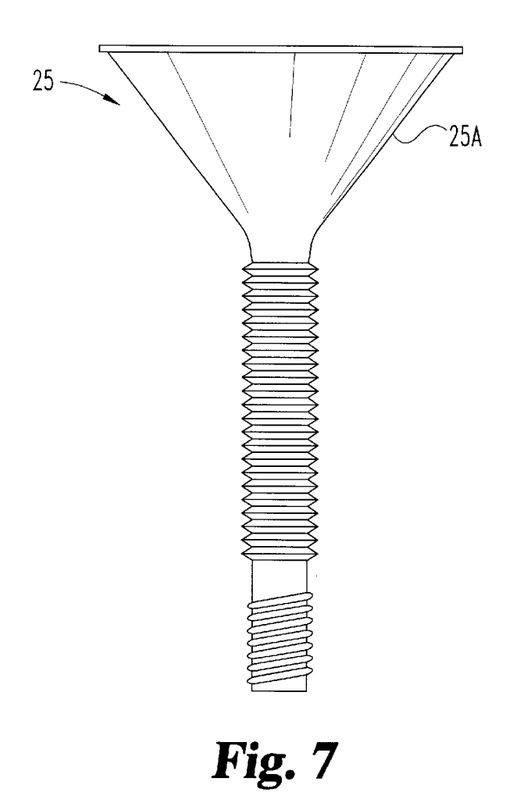
FIG. 7 is a side view of a funnel 25 shown in accordance with an alternative embodiment of the present invention.

Other embodiments are shown in FIGS. 5–7. Referring to FIG. 7, a funnel 25 is identical to funnel 14 except that funnel cup 25 has a generally conical shape. The conical shape of funnel 25 can provide access to a drain plug that may be behind a specific obstruction where the generally cylindrical shape of funnel cup 14A may be difficult to use. In FIG. 5, funnel 26 has a funnel cup 26A that is generally conically shaped and transitions directly into funnel connector member 26D. As shown in FIG. 6, funnel 26 has an extremely low profile and, when screwed into container 12, the combination of container 12 and funnel 26 together provides a very low profile. Optional vent cap 28 is also shown in FIG. 6.

Figure 4A:
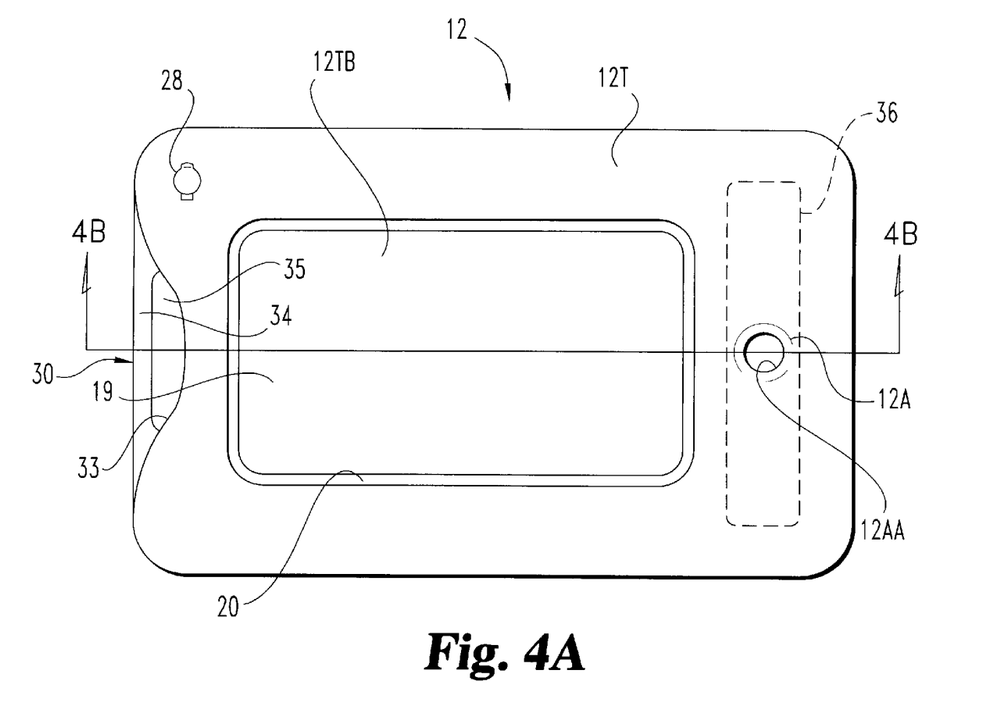
FIG. 4A is a top plan view of container 12 in accordance with an alternative embodiment of the present invention.
Figure 4B:
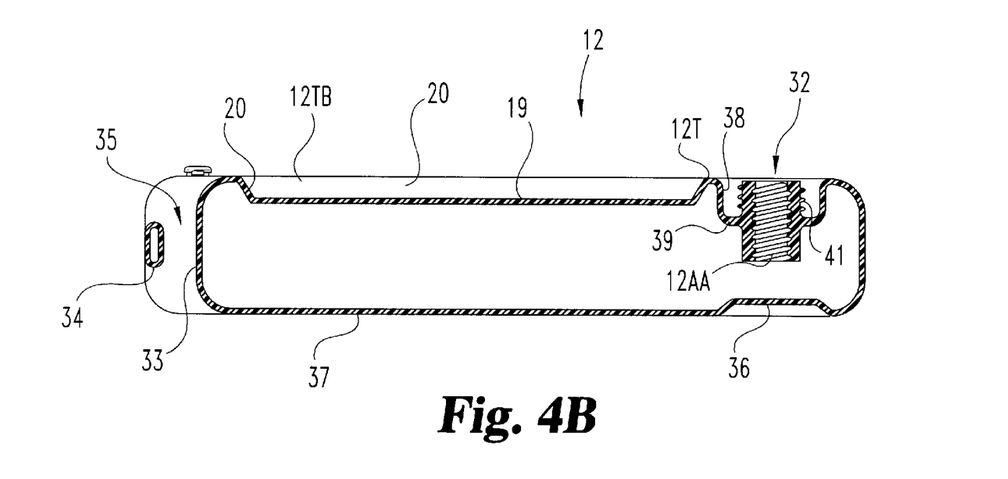
FIG. 4B is a side cross-sectional view of the container 12 of FIG. 4A taken along the lines 4B—4B and shown in the direction of the arrows.

Referring to FIGS. 4A and 4B, an alternative embodiment for container 12 is shown, which includes optional vent cap 28, carrying handle 30 and recessed connector opening 32. Carrying handle 30 is defined in container 12 by a formed indentation of one sidewall 33 and by a formed handle member 34 extending along and outwardly of that sidewall 33 to create a gap 35 sufficient to grasp handle member 34. An indentation 36 is defined in the bottom 37 of container 12, opposite the end with handle 30, to facilitate handling of container 12.

Figure 8:
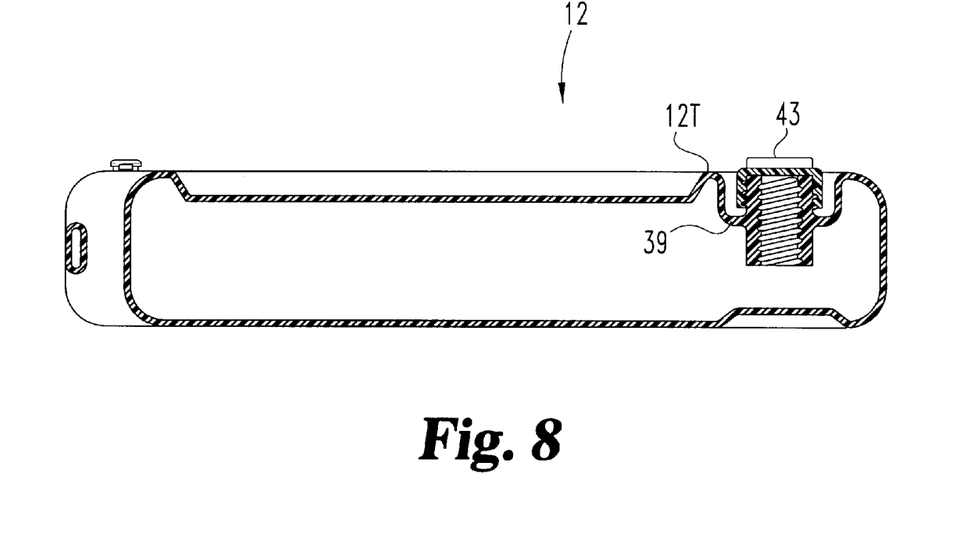
FIG. 8 is a side cross-sectional view of the container 12 of FIG. 4B and showing cap 43.

Funnel connector opening 32 is identical to funnel connector opening 12A of FIG. 2B except that a generally circular recess 38 is defined in container top 12T and connector opening 32 extends upwardly from the bottom 39 of recess 38 to form a cap portion 41. Cap portion 41 is externally threaded to receive a screw-on cap 43 (FIG. 8). This permits connector opening to be sealed off once container 12 is filled with oil and to then be carried by handle member 34.

Figure 9:
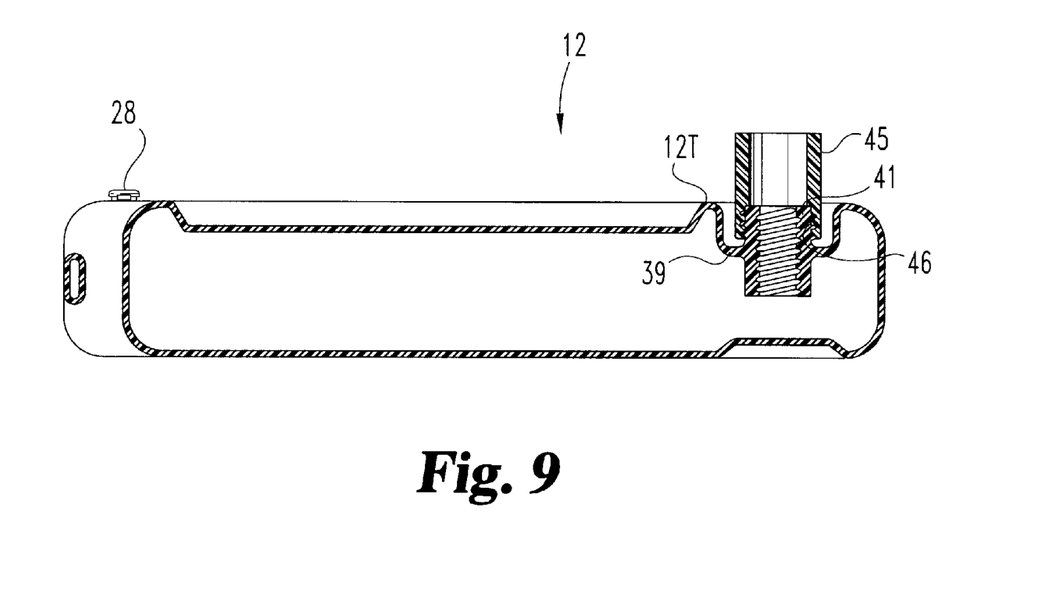
FIG. 9 is a side cross-sectional view of the container 12 of FIG. 8 and showing spout 45 replacing cap 43.

As shown in FIG. 9, a spout 45 is provided to facilitate pouring the oil from container 12. Spout 45 is generally cylindrical with internal threads at 46 at its lower end so that spout 45 may be screwed onto cap portion 41. When container 12 is ready to be dumped, cap 43 is removed and spout 45 is screwed onto cap portion 41, vent cap 28 is opened, and the oil may then be poured from container 12. Spout 45 may be configured as a curved and/or flexible member, as desired, to further facilitate pouring.

An alternative embodiment is contemplated wherein the funnel connector opening 12A and funnel connector member 14D incorporate and alternate configuration, instead of threads, to enable a removable, locking connection therebetween. Any suitable configuration is contemplated so long as it provides a leak-free interconnection.

While the invention has been illustrated and described in detail in the drawings and foregoing description, the same is to be considered as illustrative and not restrictive in character, it being understood that only the preferred embodiment and several alternative embodiments have been shown and described and that all changes and modifications that come within the spirit of the invention are desired to be protected.

What is claimed is:

1. An apparatus for collecting, storing and dumping used motor oil, comprising:

an oil container having a top, a bottom and sides and having at least one funnel connector opening sized and configured to removably receive a mating funnel connector member therein;

at least one funnel having a funnel cup and a funnel connector member connected to and in communication with said funnel cup, said funnel connector member having a size and shape which is removably lockably receivable into the at least one funnel connector opening; and, wherein said funnel includes a flexible neck connecting in communication the funnel connecting member with the funnel cup, and wherein said flexible neck has a tubular accordian shape being sufficiently pliable to be bent to an infinite variety of arcuate configurations and being sufficiently inflexible to maintain a particular configuration once bent to said particular configuration, and wherein said at least one funnel includes a plurality of differently sized funnels.

2. The apparatus for collecting, storing and dumping used motor oil of claim 1 wherein the funnel cup has a height and has a diameter that is less than the height.

3. The apparatus for collecting, storing and dumping used motor oil of claim 1 wherein the top of the oil container defines an oil collection recess for collecting and holding oil splash and overflow.

4. The apparatus for collecting, storing and dumping used motor oil of claim 1 wherein said at least one funnel includes a funnel having a generally cone shaped funnel cup.

5. The apparatus for collecting, storing and dumping used motor oil of claim 1 wherein said at least one funnel includes a flexible neck connecting in communication the funnel connecting member with the funnel cup.

6. The apparatus for collecting, storing and dumping used motor oil of claim 1 wherein said container includes means for gripping said container that includes a handle integrally defined in one side of said container opposite said at least one funnel connector opening.

7. The apparatus for collecting, storing and dumping used motor oil of claim 1 wherein said container includes means for gripping said container that includes an indentation defined in the bottom of and proximal to one side of said container.

8. The apparatus for collecting, storing and dumping used motor oil of claim 1 wherein said at least one funnel connector opening includes a first generally cylindrical member extending downwardly from the top of said container, said first generally cylindrical member having internal threads and the generally cylindrically shaped funnel connector member of said at least one funnel having external threads for threaded locking connection with said first generally cylindrical member.

9. An apparatus for collecting, storing and dumping used motor oil, comprising:

an oil container having a top, a bottom and sides and having at least one funnel connector opening sized and configured to removably receive a mating funnel connector member therein;

at least one funnel having a funnel cup and a funnel connector member connected to and in communication with said funnel cup, said funnel connector member having a size and shape which is removably lockably receivable into the at least one funnel connector opening;

wherein the top of said container defines a funnel connector recess with a bottom and said at least one funnel connector opening includes a generally cylindrical member extending upwardly form the bottom of said recess, and wherein said generally cylindrical member has internal threads and external threads.

10. The apparatus for collecting, storing and dumping used motor oil of claim 9 wherein said generally cylindrical member extends upwardly from the bottom of said recess not higher than the top of said container.

11. The apparatus for collecting, storing and dumping used motor oil of claim 9 further including a pouring spout with internal threads enabling said spout to be screwed onto said generally cylindrical member.

12. An apparatus for collecting, storing and dumping used motor oil, comprising:

an oil container having a top, a bottom and sides and having at least one funnel connector opening sized and configured to removably receive a mating funnel connector member therein and wherein the top of the oil container defines an oil collection recess for collecting and holding oil splash and overflow;

at least one funnel having a funnel cup and a generally cylindrically shaped funnel connector member connected to and in communication with said funnel cup, the funnel cup having a height and a diameter, and wherein said funnel connector member is externally threaded to enable its removable and locking receipt into the at least one funnel connector opening; and, wherein said at least one funnel connector opening includes a first generally cylindrical member extending downwardly from the top of said container, said first generally cylindrical member having internal threads and the generally cylindrically shaped funnel connector member of said at least one funnel having external threads for threaded locking connection with said first generally cylindrical member, and wherein the top of said container defines a funnel connector recess with a bottom and said at least one funnel connector opening includes a second generally cylindrical member extending upwardly from the bottom of said recess.

13. The apparatus for collecting, storing and dumping used motor oil of claim 12 wherein said second generally cylindrical member has external threads.

14. The apparatus for collecting, storing and dumping used motor oil of claim 13 wherein said second generally cylindrical member extends upwardly from the bottom of said recess not higher than the top of said container.

15. The apparatus for collecting, storing and dumping used motor oil of claim 13 further including a pouring spout with internal threads enabling said spout to be screwed onto said second generally cylindrical member.

16. A method for emptying oil from a vehicle, the vehicle including an oil drain plug, the method comprising the steps of:

providing an apparatus for collecting, storing and dumping used motor oil, the apparatus including an oil container having a top, a bottom and sides and having at least one funnel connector opening sized and configured to removably receive a mating funnel connector member therein and wherein the top of the oil container defines an oil collection recess for collecting and holding oil splash and overflow, and wherein the apparatus further includes at least one funnel having a funnel cup and a generally cylindrically shaped funnel connector member connected to and in communication with said funnel cup, the funnel cup having a height and a diameter, and wherein said at least one funnel connector opening includes a first generally cylindrical member extending downwardly from the top of said container, said first generally cylindrical member having internal threads and the generally cylindrically shaped funnel connector member of said at least one funnel having external threads for threaded locking connection with said first generally cylindrical member, and wherein the top of said container defines a funnel connector recess with a bottom and said at least one funnel connector opening includes a second generally cylindrical member extending upwardly from the bottom of said recess;

connecting said funnel to said oil container by removably locking the funnel connector member into the funnel connector opening;

positioning said apparatus under the oil drain plug of the vehicle;

position the funnel cup of said funnel subjacent the oil drain plug; and, removing the oil drain plug to allow the oil to flow into the funnel cup, through the connector member and into the oil contianer.

17. The method for emptying oil from a vehicle of claim 16 further including the steps of removing said funnel from said oil container and securing a cap to said container to close off the funnel connector opening.

* * * * *